United States Patent
Hartmann et al.

(10) Patent No.: US 7,592,026 B2
(45) Date of Patent: Sep. 22, 2009

(54) FILLED BREAD PRODUCT AND A METHOD FOR MAKING THE PRODUCT

(75) Inventors: William J. Hartmann, Duluth, MN (US); Shari Lee Emmons, Duluth, MN (US)

(73) Assignee: Jeno F. Paulucci, Sanford, FL (US)

( * ) Notice: Subject to any disclaimer, the term of this patent is extended or adjusted under 35 U.S.C. 154(b) by 161 days.

(21) Appl. No.: 11/767,872

(22) Filed: Jun. 25, 2007

(65) Prior Publication Data

US 2007/0248726 A1   Oct. 25, 2007

Related U.S. Application Data

(63) Continuation-in-part of application No. 11/226,016, filed on Sep. 14, 2005.

(51) Int. Cl.
*A21D 13/00* (2006.01)

(52) U.S. Cl. .................. 426/283; 426/391; 426/446

(58) Field of Classification Search ................. 426/283, 426/391, 446
See application file for complete search history.

(56) References Cited

U.S. PATENT DOCUMENTS 6,406,731 B1 * 6/2002 Hartman .................. 426/446

* cited by examiner

*Primary Examiner*—Keith D Hendricks
*Assistant Examiner*—Andrew Krause
(74) *Attorney, Agent, or Firm*—Ladas & Parry LLP

(57) ABSTRACT

A filled bread product and a method for producing the same, the method including coextruding an unrisen yeast-bread dough and a filling through an extruder that is capable of at least encasing the filling within the unrisen yeast-bread dough to form an unrisen filled bread product; shaping the unrisen filled bread product into a consistent flattened shape; and searing the filled bread product. The method further comprising topping, proofing, baking, cooling, grilling, freezing, and packaging the filled bread product. A grilling apparatus is also provided.

16 Claims, 3 Drawing Sheets

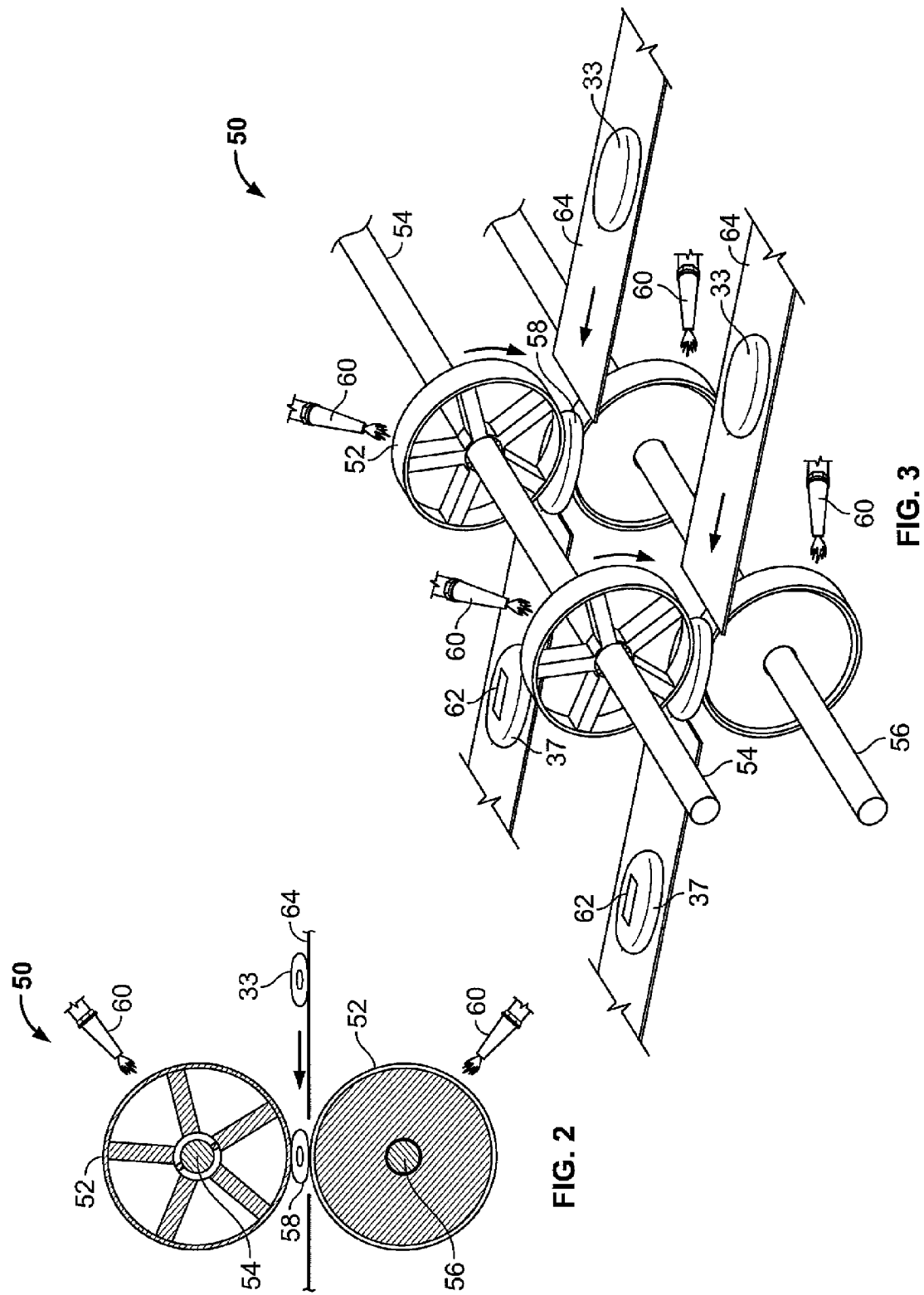

FILLED BREAD PRODUCT AND A METHOD FOR MAKING THE PRODUCT

CROSS-REFERENCE FOR RELATED APPLICATIONS

This application is a continuation in part of U.S. application Ser. No. 11/226,016 filed Sep. 14, 2005. PCT/US07/14835 is a continuation of the instant application, Ser. No. 11/767,872.

FIELD OF THE INVENTION

The present invention is directed to a filled bread product and a method of making the same. The present invention is also directed to a grilling apparatus and a method of grilling the filled bread product.

BACKGROUND OF THE INVENTION

During the last decade, a dramatic change in consumer eating patterns has been observed. Longer working hours, changing family structures and the pursuit of a healthier lifestyle are all factors that have influenced food purchasing decisions. As a result, consumers typically seek out foods that taste fresh, require minimal preparation time, can be microwaved, are conveniently packaged, and/or are portable.

The use of baking is a food process well known to food manufacturers as a preparation vehicle for foods that meet the aforementioned characteristics. For example, the baking industry which typically manufactures cupcakes, cookies, and bars, has experienced phenomenal growth as consumers now incorporate these baked foods during their eating occasions. In fact, the snack food industry, which originated in the baking industry, is prospering due to the sales of foods that are fresh-tasting, conveniently-packaged and portable.

Yeast-leavened bread products undergo yeast leavening, which is a fermentation process that depends on factors such as yeast viability, temperature, pH, starch concentration, and/or moisture. By controlling each of these factors the quality of the product is less variable from one day to the next. Many different fillings have been used in yeast-leavened bread products such as tomato sauces, cheese sauces, peanut butter, jams, jellies, or creams, and many different textural properties abound within the bread portion of the yeast-leavened bread products. Often an unleavened dough product is used in dough-based food products rather than a yeast-leavened bread product, but the goal is to produce a high-quality food product that has a fresh and homemade feel to it, which appeals to the consumers' tastes.

SUMMARY

The present invention is directed to a method of manufacturing a filled bread product comprising the steps of co-extruding an unrisen bread dough and a filling from an extruder, wherein the filling is extruded within the bread dough; pinching off the extruded bread dough and filling into discrete units such that the filling is encased by the bread dough; shaping the discrete units into a flattened shape; and searing the discrete units on one side to form an unrisen filled bread product. Additional steps comprise topping, proofing, baking, cooling, grilling, freezing, and packaging the filled bread product.

The present invention is further directed to a grilling apparatus comprising a first shaft and a second shaft disposed longitudinally parallel to each other, each shaft having at least one heated element circumferencing the shaft, and wherein the heated element on the first shaft has a portion that is parallel and adjacent to a portion of the heated element on the second shaft, with a gap disposed between said parallel portions of the heated elements; wherein the parallel portions of the heated elements of the first and second shafts move at substantially the same speed and direction; and wherein the gap is shaped and configured for a food product to pass therein.

The present invention is additionally directed to a filled bread product.

The present invention is also directed to a method of manufacturing a filled bread product comprising the steps of co-extruding an unrisen bread dough and a filling from an extruder, wherein the filling is extruded within the bread dough; pinching off the extruded bread dough and filling into discrete units such that the filling is encased by the bread dough to form an unrisen filled bread product; shaping the unrisen filled bread product into a flattened shape; topping the shaped filled bread product with a topping from a topping apparatus; searing the topped filled bread product in a searing apparatus; proofing the seared filled bread product in a proofer; baking the proofed filled bread product in an oven; cooling the baked filled bread product; grilling the cooled filled bread product with a grill; freezing the grilled filled bread product; and packaging the frozen filled bread product.

BRIEF DESCRIPTION OF THE DRAWINGS

FIG. 2 is a side elevated cross-sectional view of a preferred embodiment of the grilling apparatus.

FIG. 3 is a side perspective of a preferred embodiment of the grilling apparatus.

DETAILED DESCRIPTION OF THE PREFERRED EMBODIMENTS

Figure 1:
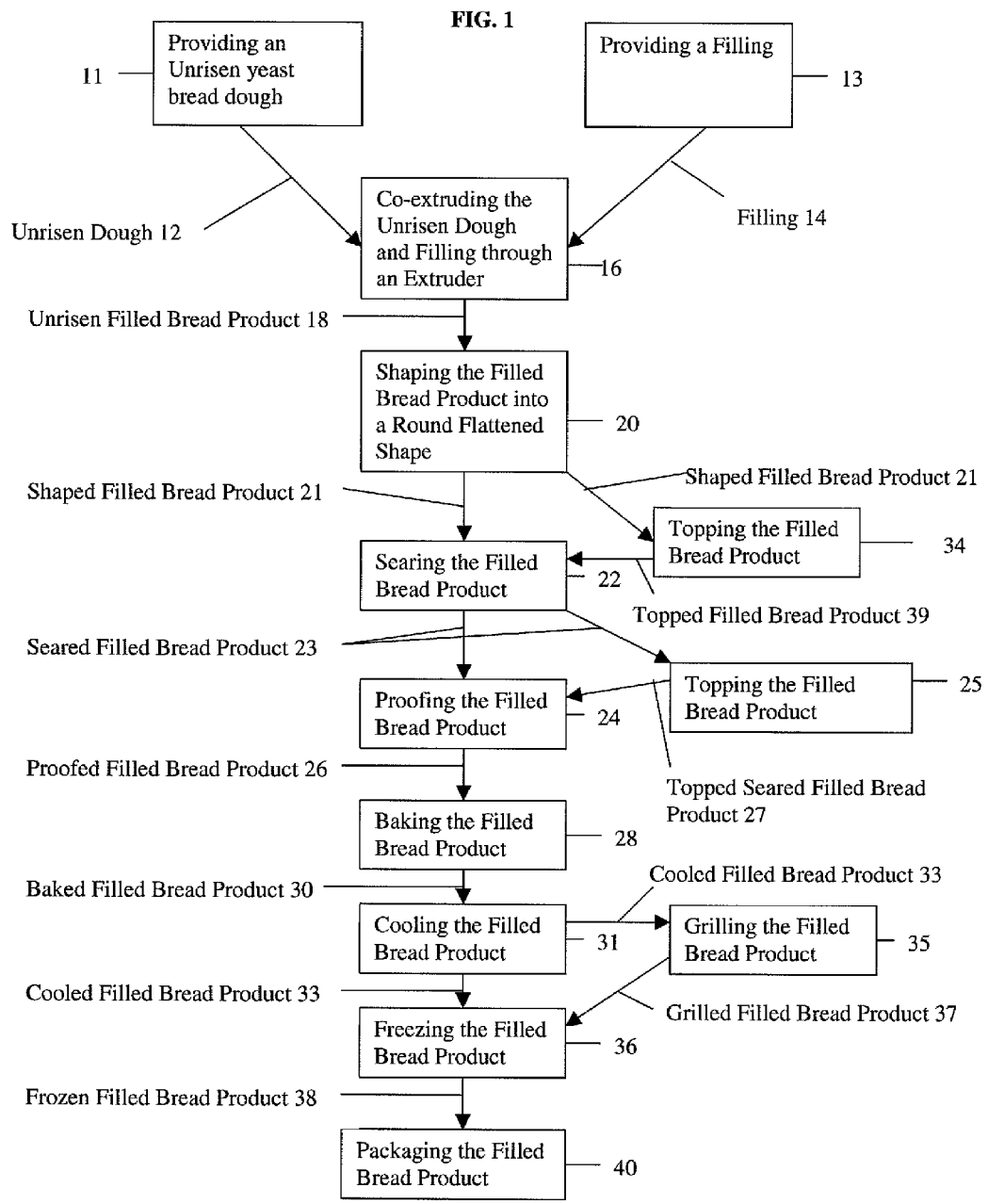
FIG. 1 is a schematic view of a process for producing a filled bread product in accordance with the present invention.

The present invention generally relates to a filled bread product and to a method of making a filled bread product. A process for producing a filled bread product is generally depicted at 10 in FIG. 1. In the process 10, an unrisen yeast bread dough 12, hereinafter referred to as an unrisen dough 12, along with a filling 14 are introduced into an extruder. At 16, the extruder co-extrudes the unrisen dough 12 and the filling 14, encasing the filling 14 within the unrisen dough 12 such that substantially all leaking of the filling 14 is eliminated. The filled unrisen bread product 18 is transferred from the extruder 16 to a conveyer belt and run under at least one roller at 20. The unrisen filled bread product 18 is rolled from a spherical shape to a round flattened shape so that it is a shaped filled bread product 21.

A shaped filled bread product 21 is conveyed to a searing apparatus at 22 that sears the bottom layer of dough. A seared filled bread product 23 is then conveyed from the searing apparatus to a proofing apparatus at 24 that allows the yeast within the unrisen dough to leaven the seared filled bread product 23. A proofed filled bread product 26 is then conveyed from the proofing apparatus to a baking apparatus at 28 that bakes the proofed filled bread product 26, and transforms the dough into a bread. The baked filled bread product 30 is then cooled in a cooling apparatus at 31. After cooling at 31, a cooled filled bread product 33 may preferably be conveyed to a grilling apparatus at 35. The grilled filled bread product 37 is then conveyed to a freezing apparatus at 36 to reduce the temperature of the grilled filled bread product 37. In another preferred embodiment, the cooled filled bread product 33 is frozen at 36 without grilling. A frozen filled bread product 38 is then discharged from the freezing apparatus. At that time, the frozen filled bread product 38 may be sent to packaging at 40 to be wrapped.

In an embodiment of the present invention, the shaped filled bread product 21 can be topped with a topping from a topping apparatus located at 34 after shaping the filled bread product at 20. In another preferred embodiment of the present invention, the seared filled bread product 23 can be topped with a topping from a topping apparatus at 25 and after the searing apparatus at 22. In yet another preferred embodiment of the present invention, a topping may be added to both the shaped filled bread product 21 and to the seared filled bread product 23.

In a preferred embodiment, the filled bread product can be conveyed along the process from the extruder to the freezing apparatus on a continuous conveyor belt. In another embodiment, the filled bread product can be transferred from the proofing apparatus to an oven, cooled on a cooling rack, and frozen in a freezer by transfer from the conveyer belt to perform any of the steps including proofing, baking, cooling, grilling, and/or freezing.

It has been discovered that preparing a filled bread product in accordance with the present invention results in a completely closed high quality filled bread product, that has substantially no leaking and that enjoys a long and extended interior and exterior shelf life. Furthermore, the filled bread product of the present invention is portable and able to withstand microwave heat when microwave heat is used to prepare the product for consumption. In fact, filled bread products of the present invention do not undergo negative textural changes, such as toughening to the bread and/or filling portion, when microwave heat is applied. The round flattened shape enjoys several advantages such as: faster baking and cooling times which translates into better food quality, more even reheating throughout the food product when microwaved, and better structural stability which allows juicer fillings to be used (such as fruit or with a higher sauce content).

The unrisen dough 12 may include one or more flour component(s), one or more liquid component(s), one or more yeast component(s), one or more fat component(s) and one or more optional additive(s). The components of the unrisen dough 12 may be supplied as individual components, or supplied in various prepared mixtures of two or more components that are subsequently combined to form the unrisen dough 12. Generally, prior to extrusion, the concentration of the flour component(s) range in an amount in weight percentage based on the total weight of the unrisen dough. The ranges of the flour, liquid, yeast, fat, and optional additive components of the unrisen dough is provided in Table 1 following. For instance, the fat component ranges from about 2 percent to 13 percent because the unrisen dough used in the filled bread products that is more like a biscuit dough is approximately 12 percent. The biscuit dough is preferably used in fruit filled dough products.

An example of component concentration ranges for a preferred formulation of the unrisen dough 12 is presented in Table 1 below:

TABLE 1

| COMPONENT | CONCENTRATION (weight percent)* |
|---|---|
| Flour component | About 55 to about 65 |
| Liquid component | About 26 to about 34 |
| Yeast component | About 0.5 to about 2.5 |
| Fat component | About 2 to about 13 |
| Optional additives | About 3 to about 5 |

*based on the total weight of the unrisen dough 12

In general, any conventional blending and kneading apparatus (not shown), such as a conventionally available bar mixer, that is suitable for homogeneously blending and kneading the flour component(s), the liquid component(s), the yeast component(s), the fat component(s) and optional additives, such as a dough conditioner, may be used to form the unrisen dough 12 and thereafter transfer the unrisen dough 12 to a hopper at 11. Preferably, the unrisen dough 12 is blended and kneaded for a time sufficient to result in a homogenous dough. If the unrisen dough 12 is blended and kneaded for too long, it will have a gummy consistency. One tool for determining if the unrisen dough 12 has been properly prepared is an amp meter on a dough mixer. The amp meter may be used to see if a generally consistent product is being prepared from batch to batch. The blending and kneading time for dough development may vary based on the initial concentration of water in each of the ingredients. For instance, variance in the storage environment for the different ingredients may vary the moisture content of those ingredients.

The final dough temperature is preferably about 70° F. to about 92° F. The liquid component temperature may be adjusted to compensate for variations in the flour component temperature to reach the final desired temperature.

The flour component included as part of the unrisen dough 12 may include a variety of different flours. Preferably, the flour component(s) is derived from flours capable of supporting leavening by the yeast, supporting the filling 14, and supporting expansion of the baked filled bread product 30 exiting the baking apparatus. Some examples of suitable flours that may be incorporated in the unrisen dough 12 include wheat flour, gluten flour, potato flour, cracked wheat, rye flour, buckwheat flour, triticale flour, rice flour, amaranth flour, whole wheat flour, bread flour, all-purpose flour, pastry flour, cake flour, instantized flour, soy flour, corn flour, cornmeal, or any combination of any of these. The flour component may be supplied as an individual flour or by individual flours or by various preparations of two or more flours. Preferably wheat flour, such as the wheat flour manufactured by Pillsbury, is used to practice the present invention.

The liquid component included as part of the unrisen dough 12 may preferably be whole milk, water, or a combination of the two. The liquid component is added to the flour component(s), yeast component(s), fat component(s), and optional additives to form the unrisen dough 12. The amount of liquid added depends on the initial concentration of water in the yeast component(s), the process feed rate of the unrisen dough 12 through the extruder 16, and the desired final product characteristics of the unrisen dough 12. Preferably, the concentration of water in the unrisen dough 12 ranges from about 26 weight percent to about 34 weight percent, based on the total weight of the unrisen dough 12. More preferably, the concentration of liquid added to the unrisen dough 12 ranges from about 30 weight percent to about 31 weight percent, based on the total weight of the unrisen dough 12. The moisture content of the unrisen dough 12 affects the taste of the final product and the functionality of the unrisen dough 12.

The yeast component included as part of the unrisen dough 12 may include compressed yeast, active dry yeast, instant quick-rising active dry yeast, liquid yeast, or a starter, or any combination of any of these. As used herein, a starter is a mixture of any liquid, yeast, sugar, and flour to form a thin yeast-containing batter that is at least capable of supporting yeast fermentation for a period of time prior to incorporation into a dough. Generally, when dry yeast, such as compressed yeast, active dry yeast, or instant quick-rising active dry yeast, is included as part of the unrisen dough 12, the dry yeast is re-hydrated in water and subsequently added to the flour component(s), the liquid component(s), the fat component(s) and optional additives.

The fat component(s) included as part of the unrisen dough 12 may be oil, such as sunflower oil, soybean oil, cottonseed oil, peanut oil, corn oil, safflower oil, olive oil, palm oil, canola oil, margarine, shortening, butter, hydrogenated fats, omega-3 fatty acids, lard, or any of these in any combination. The fat component is typically homogeneously blended into the unrisen dough 12 along with the flour component(s), liquid component(s), yeast component(s) and optional additives. Preferably, palm oil is used to practice the present invention. Not to be bound by theory, palm oil assists in creating a filled bread product that is essentially trans fat free.

Some non-exhaustive examples of optional additives that may be included in the unrisen dough 12 are salt; sugar; natural and/or artificial flavors; fiber; isoflavones; antioxidants and other nutritional supplements; herbs; spices; colors; dough conditioners; or any combination of any of these. The optional additives may be supplied as individual components or supplied in various prepared mixtures of two or more components that are subsequently combined for incorporation into the unrisen dough 12. Preferably, a dough conditioner is included in the unrisen dough 12. The dough conditioner adds to the overall dough quality and enhances the ability of the final product to withstand microwave heat without toughening.

Filled dough products can be provided with different fillings so that the following categories of flavors may preferably be produced including, but not limited to, apple, lemon, raspberry, blueberry, cherry, pepperoni, supreme, chicken cordon bleu, chicken enchilada, quesadilla, turkey Monterey, spinach and artichoke, and sausage and pepperoni pizza flavor. The filling 14 may include any number of components. The components of the filling 14 may be supplied as individual components or supplied in various prepared mixtures of two or more components that are subsequently combined to form the filling 14. In general, any conventional blending and cooking apparatus that is suitable for homogeneously blending and cooking the filling components (not shown) may be used to form the filling 14 and thereafter transfer the filling 14 into a hopper at 13. Preferably, the various components of the filling 14 maintain a proper product identity after blending and cooking. For example, if there is a meat component in the filling 14 it is preferred that the meat is cut into pieces large enough that the meat component will maintain a proper product identity throughout the process. Further, it is preferred that a proper combination of filling components is chosen so that the overall moisture content of the filling 14 is not too high. If too many highly moist ingredients are used, spurting of the filling 14 from the final product will occur as a consumer eats the final product, and the filling 14 will taste runny to the consumer. An example of component concentration ranges for a preferred formulation of the filling 14 is present in Table 2 below:

TABLE 2

| COMPONENT | CONCENTRATION (weight percent)* |
|---|---|
| Ham component | About 40 to about 50 |
| Cheese Blend component | About 15 to about 36 |
| Cheese Sauce component | About 30 to about 50 |
| Onion component | About 8 to about 12 |
| Pepperoni component | About 20 to about 30 |
| Fruit filling component | About 90 to about 99 |
| Misc. Optional Additives | About 1 to about 12 |

*based on the total weight of the filling 14

At 16, the extruder co-extrudes the unrisen dough 12 and the filling 14, as depicted in FIG. 1, at a dough temperature of about 70° F. to about 92°. The extruder 42 vertically extrudes and encases the filling 14 within the unrisen dough 12. In a preferred embodiment, a pipe is inserted in the middle of the filling 14 so that as the extruder 42 extrudes and encases the filling 14 within the unrisen dough 12, the filling 14 encases within it an additional filling. For instance, in a preferred embodiment of the filled bread product, a peanut butter and jelly filled bread product, the jelly is extruded through a pipe in the center of the peanut butter, providing a jelly center of the peanut butter, and which are together encased in the unrisen dough 12. In the peanut butter and jelly embodiment of the filled bread product, the pipe may preferably be about 5 mm in diameter.

The extruder extrudes the filling 14 and the unrisen dough 12 to form a substantially spherical shape, which can then be flattened into a rounded shaped filled bread product 21. Alternatively, this preferred dual nozzle configuration connected at the discharge end of the extruder can shape the unrisen filled bread product 18 as the unrisen filled bread product 18 exits the extruder. One preferred extruder is the Rheon® 2 Head Cornucopia Encruster Machine, a Rheon WN066 former, that is available from Rheon USA of Irvine, Calif. This type of extruder has a twelve-speed mix adjustment that allows compensation for changes in the rheological profile of the unrisen dough portion of the filled bread product during extrusion. As shown in FIG. 2, by locating the discharge end of the extruder close to the forming surface, comprising a roller and a conveyor belt, the unrisen filled bread product 18 formed there between will form in a flattened-circular shape instead of as a spherical shape. A flattened-oval shape may also be obtained by moving the forming surface in a transverse direction relative to the extruder as the unrisen dough 12 and filling 14 are being extruded. Performing the unrisen filled bread product 18 between the extruder and the forming surface requires less shaping to be subsequently performed. Less shaping allows a greater range of dough to be used, such as those having lower gluton levels like whole wheat.

The use of the dual nozzle configuration in the present invention maximizes dough expansion, while eliminating substantially all leaking of the filling from out of the unrisen dough 12. The dual nozzle configuration preferably has an extruding ratio of about 19-25 millimeters of filling 14 to about 26-30 millimeters of unrisen dough 12, for a filled bread product having a final diameter, after proofing 24 and baking 28, of approximately 2". There are no particular limits on the overall size of the unrisen filled bread product 18. Nonetheless, the unrisen filled bread product 18 preferably has about 50-60 weight percent filling 14 to about 40-50 weight percent unrisen dough 12. For instance, for a savory item the ratio may preferably be about 40 percent bread to about 60 percent filling, and for a fruit item the ratio may preferably be about 47 percent bread to about 53 percent filling. The filling encased in the dough at a specified dough to filling ratio, for instance a 20 mm filling core surrounded by a 5 mm thick dough layer, should preferably give a raw weight of from about 0.8 oz to about 1.2 oz. The ratio of filling 14 to unrisen dough 12 affects not only the taste of the final product, but also the functionality of the product. For example, if there is too much filling 14 in relation to the amount of unrisen dough 12, leaking of the filling 14 out of the final product may occur, especially if the filling 14 includes larger pieces of food, such as meat, within the filling 14. Leaking of the filling 14 out of the product is undesirable for a number of reasons including that the overall net weight of the final product will be reduced resulting in an inconsistent product size, the product will be messier to eat, and the product will look less desirable to consumers.

The unrisen filled bread product 18 exits the nozzle configuration connected at the discharge end of the extruder through a shutter adjustment (not shown), such as an iris diaphragm, that cuts or pinches the unrisen filled bread product 18 at a designated length. It has been discovered that the iris diaphragm, when used to cut the unrisen filled bread product 18, is capable of at least pushing the filling 14 that is vertically placed within the unrisen dough 12 away from the edges of the unrisen dough 12 to eliminate leaking of the filling 14. The iris diaphragm is also capable of pinching the edges of the unrisen dough 12 together to further prevent leakage of the filling 14 from out of the unrisen dough 12 and to form a closed, seamless unrisen filled bread product.

The unrisen filled bread product 18 is conveyed on a continuous conveyor belt from the extruder to at least one set of roller(s) and conveyor belts at 20 to further shape the unrisen filled bread product 18. The unrisen filled bread product 18 runs under at least one roller while the other side remains on the conveyor belt to flatten the unrisen filled bread product 18. Preferably, the shaped filled bread product 21 is in a flattened round shape after exiting the roller(s).

The shaped filled bread product 21 can then preferably be conveyed to a topping apparatus at 34 comprising a topping and a roller which very lightly rolls the topping into the unrisen dough 12 of the shaped filled bread product 21. The topping may comprise such preferred ingredients as cheese and/or spices.

The topped filled bread product 39 is then conveyed to the searing apparatus at 22, preferably a Pro-Bake oven, for instance an FMC Pro-Bake oven. Preferably, the shaped filled bread product 21 is seared for between about 15 seconds to about one minute and 15 seconds, depending on the type of filled bread product desired. The searing apparatus sears the bottom layer of the dough. By searing the bottom of the filled bread product, each filled bread product can get the direct benefit of the proofing apparatus and the oven without the need for a paper or pan interface between the filled bread product and the conveyer belt, and thereby reducing the cost of production by dispensing with paper or pans.

The process for making a filled dough product can be performed on any conventional apparatus that can transfer and/or convey unrisen dough, for instance a conveyor belt that is smooth, flexible, heated, and made of a non-stick material for instance Teflon®. The process may be either preferably continuous or non-continuous. A continuous process provides that the filled dough product is conveyed from the extruder through the searing apparatus, the proofer, the oven, cooled, grilled, and frozen. Each apparatus (such as the proofer, the oven, and the freezer) has its own belt and the product is then transferred from the belt of one apparatus to the belt of another so that a continuous in flow is achieved from the extruder to the freezer. In a non-continuous system, the filled bread product is conveyed through some steps but is then moved off the belt to an apparatus without a belt, thus breaking the continuous flow in a non-continuous line to perform remaining steps in the process 10.

The seared filled bread product 23 is then conveyed from the searing apparatus at 22 to a proofing apparatus at 24. In a preferred embodiment, a topping apparatus may also be positioned after the searing apparatus at 25 so that after the seared filled bread product 23 exits the searing apparatus at 22, the seared filled bread product 23 is topped with a topping from a topping apparatus at 25 comprising a topping and a roller. The topped seared filled bread product 27 is then conveyed to the proofing apparatus at 24. As used herein, a proofing apparatus is an apparatus that is at least capable of supporting yeast fermentation sufficient to leaven the unrisen dough. The proofing apparatus is preferably operated for about 20-35 minutes, and more preferably 30-35 minutes, at a temperature of about 100° F. to about 105° F. at about 60-80% humidity, more preferably at about 76% humidity, to sufficiently leaven the unrisen dough 12 and form a filled proofed dough 26. The humidity level and temperature level used while proofing 24 substantially affects the moisture level of the final product.

Proofing 24 aerates the dough of the product. This aeration in combination with the dough conditioners used to make the dough, enable the final product to be heated by a consumer without causing the product to toughen while heating. An aerated product offers a more desirable taste to the consumer. The aeration also helps the final product to enjoy a longer interior shelf life. Proofing 24 further enhances the overall color of the final product and the size of the final product. The length of time that the product is proofed is important so that no bursting or air bubbles form in the product when it is heated. The liquidity inherent in the ingredients that make up the filling may cause gas formation upon heating. If the dough is under proofed it does not acquire enough elasticity to expand when gas formation occurs. Thus, leakage of the filling may occur. Further, if the dough is over proofed, the final product may not fit in standard sized packaging for the product. Over proofing may also cause leakage because it may cause the dough to over expand and experience bursting.

The filled proofed dough 26 is transferred from the proofing apparatus to a baking apparatus at 28 that increases the temperature of, and reduces the moisture content of the proofed filled bread product 26 to form a baked filled bread product 30. The baking apparatus may be any conventional baking apparatus that is suitable for baking 28 a yeast-leavened bread product. In the continuous conveyor belt embodiment, a continuous belt oven may preferably be used. In the non-continuous conveyor belt embodiment, a rack oven may preferably be used. The conventional rack oven may be adjusted to divert airflow to allow for uniform baking. The baking apparatus is operated at a temperature of about 350° F. to about 500° F., preferably at about 460° F., for about 4 minutes to about 6 minutes. For instance for savory filled bread products, preferably the filled bread product is baked at about 450° F., and for fruit filled bread products, preferably the filled bread product is baked at about 475° F.

In another preferred embodiment, steam may be injected into the baking apparatus 28 for about three seconds to about 5 seconds, at the beginning of baking 28, to optionally increase the temperature of the filled bread product (not shown), to optionally increase the moisture content, sheen and crust formed at the surface of the baked filled bread product 30, and to optionally gelatinize the flour component(s) of the baked filled bread product 30. Over steaming of the product will cause the product to toughen. Preferably, the savory filled bread products are steamed, and preferably the fruit filled bread products are not steamed.

The baked filled bread product 30 is then cooled in a cooling apparatus at 31 to a minimum temperature of about 130° F.

Preferably, the cooled filled bread product 33 may be grilled in a grilling apparatus at 35 to impress grill marks, forming a grilled filled bread product 37. Grill marks are preferred for savory filled bread products, and also preferred if aesthetically pleasing on the product. Traditional grilling techniques may be used.

A preferred grilling apparatus 50 is depicted in FIGS. 2 and 3. FIG. 2 is a side cross-sectional view of the grilling apparatus 50 that includes at least one heated element 52 on each of a first shaft and a second shaft 54, 56. The heated elements 52 may preferably be substantially hollow or solid. Preferably multiple evenly spaced heated elements 52 are disposed on each shaft 54, 56, as shown in the side perspective view of a preferred grilling apparatus 50. The heated elements 52 may preferably be rings, preferably made of steel, a steel alloy or any other material that can be used to leave a grill mark 62 on the filled bread product 58 without destroying the integrity of the product, including metals. The heated elements 52 are preferably arranged such that they circumference the outer margin of each shaft 54, 56, as for instance a washer and screw arrangement, on both the first and second shafts 54, 56. Preferably multiple heated elements 52 on a shaft 54, 56 have the same distance between each, as each one is thick. The heated elements 52 are the same thickness as the grill marks 62 on the grilled filled bread product 37. The number of heated elements 52 on the shafts 54, 56 can vary according to preference and the size and shape of the filled bread product 58 to be marked, as well as the length of the shafts 54, 56. Preferably, the distance between each of the heated elements 52 can be maintained by the use of spacers (not shown).

Preferably each of the shafts 54, 56 is longitudinally parallel to the other and extends the width of the grilling apparatus 50, as depicted in FIG. 3. The first shaft 54 has floating heated elements 52 loosely retained thereon so that as a filled bread product 58 passes under the heated element(s) 52, the heated element(s) 52 can impress a light grill mark 62, without leaving a deep impression or a dark grill mark on the product, by adapting to the contours on the surface of the filled bread product 58. The second shaft 56 has a heated element(s) 52 that is affixed to the second shaft 56, and the second shaft 56 heated element(s) 52 is positioned directly adjacent, and parallel to, that of a heated element(s) 52 on the first shaft 54 so that as the filled bread product 58 passes under the first shaft 54 and is marked by at least one heated element 52 on the first shaft 54, the filled bread product 58 is also being marked by at least one heated element 52 on the second shaft 56. The first shaft 54 is positioned parallel to the second shaft 56 and the distance between the heated element(s) 52 on the first and second shafts 54, 56 is adjustable to account for a wide range of preferred variations in the products' shapes and sizes.

In use, the grilling apparatus 50 conveyor belt 64 conveys the cooled filled bread product 33 into the grill chamber. As the cooled filled bread product 33 is conveyed through the apparatus 50, it is conveyed between the first and second shafts 54, 56, which rotate at the same speed as the conveyor belt 64 that conveys the cooled filled bread product 33 into the grilling apparatus 50. As each filled bread product 58 passes between the first and second shafts 54, 56, it receives a grill mark 60. The first and second shaft 54, 56 and heated element(s) 52 are independently controlled and heated, for instance by gas-fired burners 60.

Before coming in contact with the filled bread product 58, the heated elements 52 are elevated in temperature. Preferably, the temperature of the heated elements 52 is between about 300° F. to about 500° F. This temperature is substantially lower than most typical grilling devices, and browns the dough instead of charring the dough, which can leave an undesirable taste on the food product.

Figure 4:
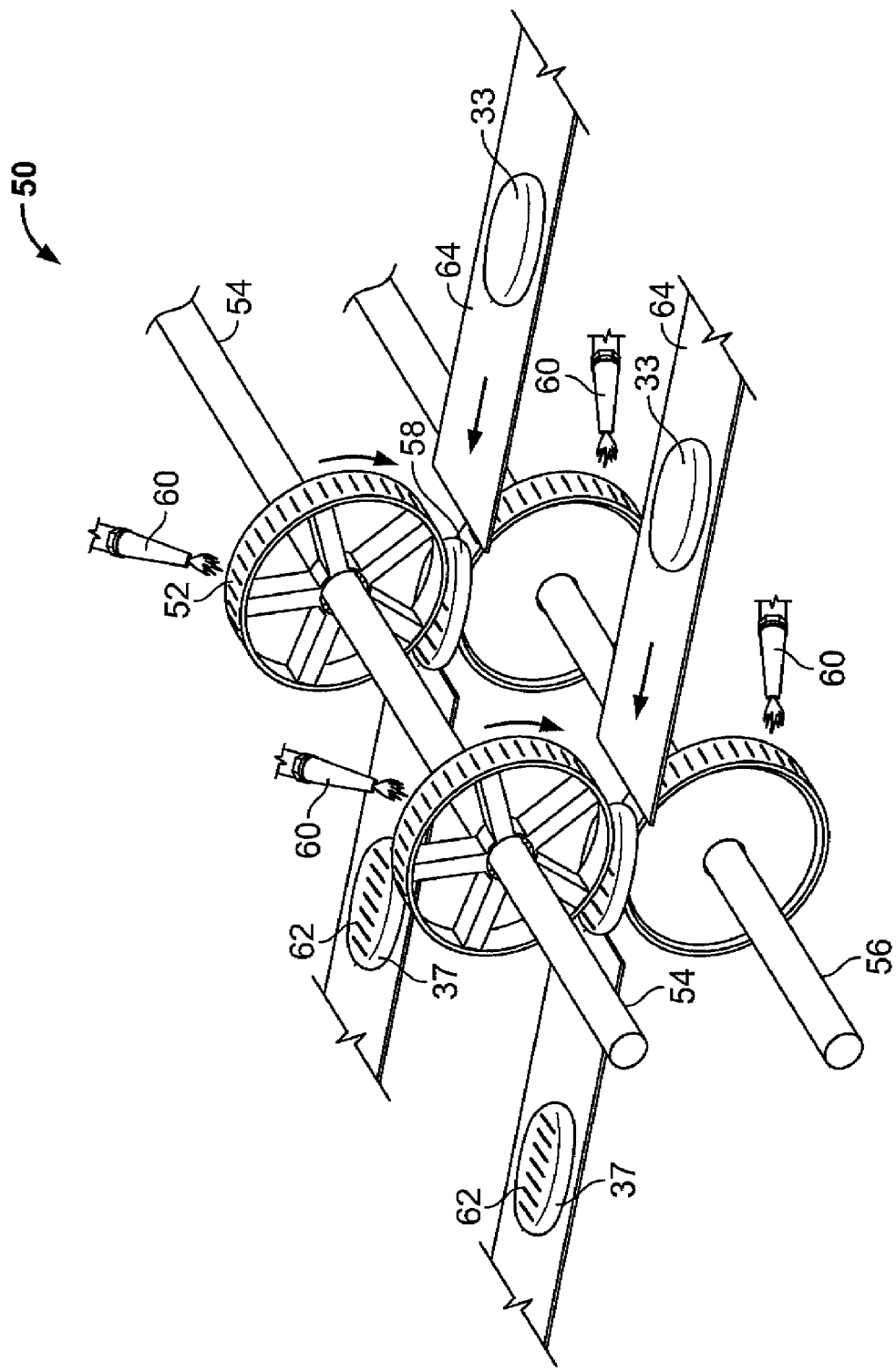
FIG. 4 is a side perspective of a preferred embodiment of the grilling apparatus.

Any number of grill marks 62 may be formed on the grilled filled bread product 37. However, preferably, about three to four linear and parallel grill marks may be formed on a 2 inch diameter filled bread product and more on larger items as is aesthetically pleasing and desired. To do so, the heated elements 52 should preferably be placed close enough together on each shaft 54, 56 so that more than one heated element 52 contacts the surface of the filled bread product 58 at one time (not shown). As shown in the side perspective of the preferred embodiment depicted in FIG. 4, multiple grill marks 62 can also be made by designing the surface of the heated element(s) 52 so that when it comes into contact with the filled bread product 58, it creates a design bearing multiple grill marks 62.

The grilled filled bread product 37 is then conveyed from the grilling apparatus 50 to a freezing apparatus at 36 that reduces the temperature of the grilled filled bread product 37 to form a frozen filled bread product 38. The grilled filled bread product 37 is frozen at 36 before packaging at 40 to ensure that there is no moisture trapped in the package after packaging occurs. However, after the grilled filled bread product 37 is frozen at 36, it is desirable that wrapping or packaging of the frozen filled bread product 38 occurs rather quickly. If the frozen filled bread product 38 is frozen at 36 for too long without wrapping at 40, the frozen filled bread product 38 may experience freezer burn. In general, any conventional apparatus and technique that is suitable for freezing a bread product, such as the use of a static ammonia freezer, continuous freezer, nitrogen tunnel, spiral freezer, or automated in-line freezer may be used to reduce the temperature of the grilled filled bread product 37 to form a frozen filled bread product 38. For instance, one type of suitable freezer is an ammonia freezer. The internal temperature of the grilled filled bread product 37 may be rapidly reduced in a suitable freezer to a temperature of less than about 24° F., resulting in an overall freezing time before packaging at 40 of less than one hour.

To prepare the frozen filled bread product 38 for consumption, a consumer may heat the frozen filled bread product 38 in any suitable heating apparatus, such as a microwave oven, conventional oven, or toaster oven, or if preferred, the consumer may leave the frozen filled bread product 38 to thaw as desired.

Although the present invention has been described with reference to preferred embodiments, workers skilled in the art will recognize that numerous changes may be made in form and detail without departing from the spirit and scope of the invention.

The invention claimed is:

1. A method of manufacturing a filled bread product comprising the steps of:
    co-extruding an unrisen bread dough and a filling from an extruder, wherein the filling is extruded within the bread dough;
    pinching off the extruded bread dough and filling into discrete units such that the filling is encased by the bread dough;
    shaping the discrete units into a flattened shape;
    searing the discrete units on one side to form an unrisen filled bread dough product;
    proofing the filled bread dough product; and baking the filled bread dough product to form a filled bread product.

2. The method of claim 1, wherein shaping the discrete units is performed by passing each discrete unit between two converging surfaces, moving at substantially the same speed relative one another at a closest point of contact.

3. The method of claim 2, wherein said two converging surfaces are at least one of a roller and a conveyor belt.

4. The method of claim 1, wherein shaping the discrete units is at least partially performed by locating a discharge end of the extruder in close proximity to a forming surface so that co-extruded dough and filling is extruded in a lateral direction between the discharge end of the extruder and the forming surface, forming said flattened shape.

5. The method of claim 1, wherein pinching off the extruded unrisen bread dough and filling into discrete units is performed by a shutter adjustment on the extruder which pushes the filling away from the edges of the bread dough and pinches the edges of the unrisen bread dough together to form a closed, unrisen filled bread dough product.

6. The method of claim 1 further comprising the step of:
topping the filled bread dough product with a topping from a topping apparatus.

7. The method of claim 1, further comprising the step of:
cooling the filled bread product after baking.

8. The method of claim 7 further comprising the step of:
forming grill marks on at least one side of the filled bread product.

9. The method of claim 8, wherein forming the grill marks is performed by passing the filled bread product between a portion of at least one heated element on a first shaft and a portion of at least one heated element on a second shaft, wherein the portion of at least one heated element on the second shaft is parallel and adjacent to the portion of at least one heated element on the first shaft, and wherein the portions are moving at substantially the same speed and each impresses a grill mark into the filled bread product simultaneously.

10. The method of claim 9, wherein at least two evenly spaced heated elements are on each of the shafts and wherein the heated elements are arranged in a longitudinal direction.

11. The method of claim 9, wherein the heated element is a ring.

12. The method of claim 9, wherein the heated element is heated to a temperature of about 500° F.

13. The method of claim 7 or 8 further comprising the steps of:
freezing the filled bread product; and
packaging the filled bread product.

14. The method of claim 1, wherein the filled bread product is shaped in the form of a flattened round filled bread product.

15. The method of claim 11 wherein baking the filled bread dough product comprises exposing the filled bread dough product to steam.

16. A method of manufacturing a filled bread product comprising the steps of:
co-extruding an unrisen bread dough and a filling from an extruder, wherein the filling is extruded within the bread dough;
pinching off the extruded bread dough and filling into discrete units such that the filling is encased by the bread dough to form an unrisen filled bread product;
shaping the unrisen filled bread dough product into a flattened shape;
topping the shaped filled bread dough product with a topping from a topping apparatus;
searing the topped filled bread dough product in a searing apparatus;
proofing the seared filled bread dough product in a proofer;
baking the proofed filled bread dough product in an oven;
cooling the baked filled bread product;
grilling the cooled filled bread product with a grill;
freezing the grilled filled bread product; and
packaging the frozen filled bread product.

\* \* \* \* \*